United States Patent
Mattingly et al.

(10) Patent No.: US 10,331,123 B2
(45) Date of Patent: Jun. 25, 2019

(54) TASK MANAGEMENT OF AUTONOMOUS PRODUCT DELIVERY VEHICLES

(71) Applicant: Walmart Apollo, LLC, Bentonville, AR (US)

(72) Inventors: Todd D. Mattingly, Bentonville, AR (US); Donald R. High, Noel, MO (US); Bruce W. Wilkinson, Rogers, AR (US); Joseph Jurich, Jr., Molino, FL (US); Brian G. McHale, Chadderton Oldham (GB); Robert L. Cantrell, Herndon, VA (US); John J. O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/039,118

(22) Filed: Jul. 18, 2018

(65) Prior Publication Data

US 2019/0025817 A1    Jan. 24, 2019

Related U.S. Application Data

(60) Provisional application No. 62/535,142, filed on Jul. 20, 2017.

(51) Int. Cl.
*G01C 22/00* (2006.01)
*G05D 1/00* (2006.01)
(Continued)

(52) U.S. Cl.
CPC ......... *G05D 1/0027* (2013.01); *G05D 1/0088* (2013.01); *G06F 16/27* (2019.01);
(Continued)

(58) Field of Classification Search
CPC .... G05D 1/0027; G05D 1/0088; G06F 16/27; G06Q 10/083; G07C 5/008; H04L 9/0637; H04L 9/0825; B64C 39/024
(Continued)

(56) References Cited

U.S. PATENT DOCUMENTS 7,343,222 B2    3/2008    Solomon
7,613,563 B2    11/2009   Haegebarth
(Continued)

OTHER PUBLICATIONS

PCT; App. No. PCT/US2018/042383; International Search Report and Written Opinion dated Sep. 20, 2016.
(Continued)

*Primary Examiner* — Mahmoud S Ismail
(74) *Attorney, Agent, or Firm* — Fitch, Even, Tabin & Flannery LLP

(57) ABSTRACT

Systems, apparatuses, and methods are provided herein for autonomous vehicles task management and organization. A system for organizing autonomous product delivery vehicles comprises a locomotion system of a first autonomous vehicle, a communication device, a memory device, and a control circuit. The control circuit being configured to retrieve one or more vehicle tasks assigned to the first autonomous vehicle from a hash chain database, decrypt the task parameters with a private key of the first autonomous vehicle stored on the memory device, identify a second autonomous vehicle as a transferee of the one or more vehicle tasks based on transfer rules in the task parameters, and update the hash chain database with a new block comprising a hash of preceding data in the hash chain database and the task parameters of the one or more vehicle tasks encrypted with a public key of the second autonomous vehicle.

20 Claims, 9 Drawing Sheets

(51) Int. Cl.
*G07C 5/00* (2006.01)
*H04L 9/08* (2006.01)
*G06Q 10/08* (2012.01)
*H04L 9/06* (2006.01)
*G06F 16/27* (2019.01)
*G05D 3/00* (2006.01)
*G06F 7/00* (2006.01)
*G06F 17/00* (2019.01)
*G06F 19/00* (2018.01)

(52) U.S. Cl.
CPC ........... *G06Q 10/083* (2013.01); *G07C 5/008* (2013.01); *H04L 9/0637* (2013.01); *H04L 9/0825* (2013.01); *G05D 2201/0213* (2013.01); *H04L 2209/38* (2013.01)

(58) Field of Classification Search
USPC ........................................ 701/23, 2; 700/245
See application file for complete search history.

(56) References Cited

U.S. PATENT DOCUMENTS

| | | | |
|---|---|---|---|
| 7,831,345 | B2 | 11/2010 | Heino |
| 8,190,322 | B2 | 5/2012 | Lin |
| 8,229,604 | B2 | 7/2012 | Villaume |
| 9,020,636 | B2 | 4/2015 | Tadayon |
| 9,165,470 | B2 | 10/2015 | Mudalige |
| 9,230,236 | B2 | 1/2016 | Villamar |
| 9,355,423 | B1 | 5/2016 | Slusar |
| 9,390,451 | B1 | 7/2016 | Slusar |
| 9,550,577 | B1 | 1/2017 | Beckman |
| 9,573,684 | B2 | 2/2017 | Kimchi |
| 2005/0256910 | A1 | 11/2005 | Kim |
| 2006/0161341 | A1 | 7/2006 | Haegebarth |
| 2008/0059007 | A1 | 3/2008 | Whittaker |
| 2010/0256836 | A1 | 10/2010 | Mudalige |
| 2013/0338825 | A1 | 12/2013 | Cantor |
| 2014/0172194 | A1* | 6/2014 | Levien ................... B64C 39/024 701/2 |
| 2015/0120094 | A1 | 4/2015 | Kimchi |
| 2015/0277440 | A1 | 10/2015 | Kimchi |
| 2015/0336270 | A1* | 11/2015 | Storr ...................... B25J 9/1674 700/245 |
| 2015/0356794 | A1 | 12/2015 | Prakah-Asante |
| 2016/0196755 | A1 | 7/2016 | Navot |
| 2016/0214717 | A1 | 7/2016 | De Silva |
| 2016/0257401 | A1 | 9/2016 | Buchmueller |
| 2016/0280370 | A1 | 9/2016 | Canavor |
| 2017/0110017 | A1 | 4/2017 | Kimchi |

OTHER PUBLICATIONS

PCT; App No. PCT/2018/042820; International Search Report and Written Opinion dated Sep. 25, 2018.

* cited by examiner

TASK MANAGEMENT OF AUTONOMOUS PRODUCT DELIVERY VEHICLES

CROSS-REFERENCE TO RELATED APPLICATION

This application claims the benefit of the following U.S. Provisional Application No. 62/535,142 filed Jul. 20, 2017, which is incorporated herein by reference in its entirety.

TECHNICAL FIELD

This invention relates generally to unmanned vehicles.

BACKGROUND

An unmanned vehicle generally refers to a motored vehicle without a human driver or pilot aboard.

BRIEF DESCRIPTION OF THE DRAWINGS

Disclosed herein are embodiments of apparatuses and methods for organizing autonomous product delivery vehicles. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for organizing autonomous product delivery vehicles. In some embodiments, a system for organizing autonomous product delivery vehicles comprises a locomotion system of a first autonomous vehicle, a communication device configured to communicate with other autonomous vehicles in an autonomous vehicle fleet comprising at least the first autonomous vehicle, a memory device, and a control circuit of the first autonomous vehicle coupled to the communication device and the memory device. The control circuit being configured to retrieve one or more vehicle tasks assigned to the first autonomous vehicle from a hash chain database associated with the autonomous vehicle fleet, wherein task parameters of the one or more vehicle tasks is at least partially encrypted with a public key of the autonomous vehicle, decrypt the task parameters with a private key of the first autonomous vehicle stored on the memory device, determine whether to perform the one or more vehicle tasks with the locomotion system of the first autonomous vehicle, detect a task transfer condition for the one or more vehicle tasks, identify, automatically by the first autonomous vehicle in response to the task transfer condition, a second autonomous vehicle as a transferee of the one or more vehicle tasks based on transfer rules in the task profile, and update, via the communication device, the hash chain database with a new block comprising a hash of preceding data in the hash chain database and the task parameters of the one or more vehicle tasks encrypted with a public key of the second autonomous vehicle.

Figure 1:
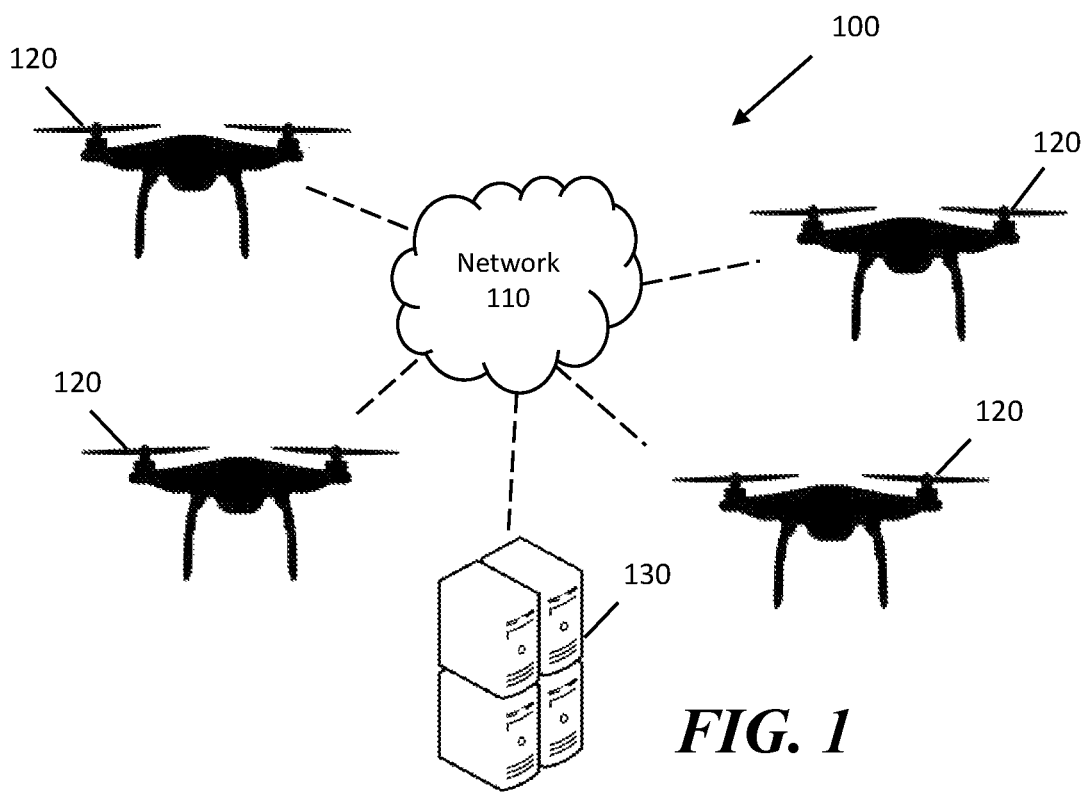
FIG. 1 is a system diagram of a system in accordance with several embodiments.

Referring now to FIG. 1, an autonomous vehicle system according to some embodiments is shown. The system 100 includes a plurality of autonomous vehicles 120 communicating over a network 110. The system 100 may optionally include a server system 130 accessible by one or more of the autonomous vehicles 120 over the network 110.

An autonomous vehicle 120 may generally comprise a vehicle configured to travel, perform tasks, and response to travel conditions without a human driver/pilot. While only aerial vehicles are shown in FIG. 1, in some embodiments, the system 100 may comprise one or more unmanned aerial vehicles (UAV), unmanned ground vehicles (UGV), unmanned watercraft, self-driving vehicles, passenger vehicles, cargo vehicles, etc. In some embodiments, the autonomous vehicle 120 may comprise a vehicle with autonomous, semi-autonomous, remotely piloted, and/or manual modes. In some embodiments, an autonomous vehicle 120 may be configured to perform tasks based on information stored in a distributed hash chain database stored on one or more of the autonomous vehicles 120 and/or the server system 130. In some embodiments, an autonomous vehicle 120 may be configured to perform tasks based on instructions received from a master vehicle in the system 100. In some embodiments, the autonomous vehicles 120 in the system 100 may comprise vehicles traveling in a swarm or a pod. In some embodiments, the autonomous vehicles 120 in the system 100 may comprise geographically dispersed vehicles. In some embodiments, one or more autonomous vehicles 120 may join and leave the system based on one or more of vehicle location, vehicle task assignment, vehicle condition, travel condition, etc. An example of an autonomous vehicle is described with reference to FIG. 2 herein. In some embodiments, one or more autonomous vehicles 120 may be configured to perform one or more steps described with reference to FIGS. 3-5 herein.

The network 110 may generally comprise wireless connections that allow the autonomous vehicle 120 in the system 100 to communicate with one or more other vehicles in the system and/or with the server system 130. In some embodiments, the network 110 may comprise a wireless local area network (WLAN) such as one or more of a Wi-Fi network, a Wi-Fi direct network, a Bluetooth network, an ad hoc network, a peer-to-peer network, a wireless distribution system, and the like. A group of autonomous vehicles 120 traveling in a swarm or in close proximity to each other may form a WLAN network. In some embodiments, the network 110 may comprise a wireless wide area network (WWAN) such as one or more of a cellular data network, an LTE network, a WiMAX network, a UMT network, a CDMA network, a GSM network, and the like. In some embodiments, the vehicle may communicate with each other through a WLAN and communicate with the server system 130 via a WWAN.

The server system 130 may comprise a memory storage device accessible by the autonomous vehicles 120. In some embodiments, the server system 130 may store at least a portion of a hash chain database used for managing the autonomous vehicles 120 in the system 100. In some embodiments, the server system 130 may store vehicles statuses and task assignments associated with one or more autonomous vehicles 120 in the system 100. In some embodiments, the server system 130 may comprise a control circuit for updating the hash chain database and/or for providing information/instructions to one or more of the autonomous vehicles 120. In some embodiments, the server system 130 may be omitted in the system 100 and the autonomous vehicles 120 may be configured to operate without communicating with the server system 130. For example, a swarm of autonomous vehicles 120 may travel and perform tasks for an extended period of time while only communicating with other vehicles in the swarm through a WLAN. In some embodiments, the server system 130 may comprise a failsafe system configured to provide information to an autonomous vehicle 120 when the autonomous vehicles 120 is unable to communicate with another autonomous vehicle 120 or a master vehicle in a fleet. In some embodiments, the server system 130 may be configured to provide the initial task parameters and task assignments to the autonomous vehicle 120 but may not communicate with the autonomous vehicles 120 while the autonomous vehicles 120 are traveling to perform a task.

Figure 2:
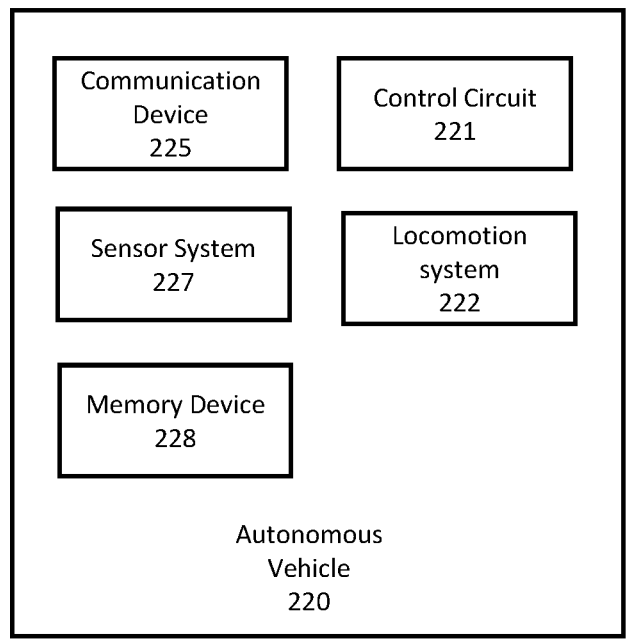
FIG. 2 is a block diagram of a system in accordance with several embodiments.

Referring now to FIG. 2, an autonomous vehicle according to some embodiments is shown. The autonomous vehicle 220 comprises a control circuit 221, a locomotion system 222, a communication device 225, a sensor system 227, and a memory device 228.

The autonomous vehicle 220 may comprise a vehicle configured to travel and perform a variety of tasks. In some embodiments, the autonomous vehicle 220 may comprise a UAV such as a bicopter, a tricopter, a quadcopter, a hexacopter, an octocopter, etc. In some embodiments, the autonomous vehicle 220 may comprise a UGV configured to travel on the automobile roadway and/or other types of paths. In some embodiments, the autonomous vehicle 220 may be configured to carry persons, packages, and/or other types of cargo.

The control circuit 221 may comprise a processor, a microprocessor, and the like and may be configured to execute computer readable instructions stored on a computer readable storage memory 228. The control circuit 221 may be communicatively coupled to one or more of the locomotion system 222, the communication device 225, the sensor system 227, and the memory device 228. The computer readable storage memory 228 may comprise volatile and/or non-volatile memory and have stored upon it a set of computer readable instructions which, when executed by the control circuit 221, cause the control circuit 221 to navigate the autonomous vehicle 220 and communicate with other devices. Generally, the control circuit 221 may be configured to navigate the autonomous vehicle 220 based on the sensor system 227 and perform assigned tasks. In some embodiments, the control circuit 221 may be configured to determine task transfer conditions and update a hash chain database to transfer tasks to a different autonomous vehicle. In some embodiments, the control circuit 221 may be configured to select and verify a master vehicle in a group of vehicles based on a hash chain database. In some embodiments, the memory device 228 may store at least a portion of the hash chain database. In some embodiments, the memory device 228 may further store a copy of a private key associated with the autonomous vehicle for communicates based on asymmetric key cryptography. In some embodiments, the control circuit 221 executing codes stored on the memory device 228 may be configured to perform one or more steps described with reference to FIGS. 3-5 herein.

The locomotion system 222 may comprise one or more motors that control one or more of a speed, direction, and/or orientation of one or more propellers and/or wheels on the autonomous vehicle 220. The locomotion system 222 may be configured to be controlled by the control circuit 221 to steer and drive the autonomous vehicle 220 in designated directions. In some embodiments, the locomotion system 222 may comprise rotors and/or propellers on a UAV. In some embodiments, the locomotion system 22 may comprise engines and wheels of a UGV.

The communication device 225 may comprise one or more of a WLAN transceiver, a WWAN transceiver, a mobile data network transceiver, a satellite network transceiver, a WiMax transceiver, a Wi-Fi transceiver, a Bluetooth transceiver, and the like. In some embodiments, the communication device 225 may be configured to allow the control circuit 221 to communicate with the one or more another vehicles and a server system. In some embodiments, the communication device 225 may be configured to form a peer-to-peer network with other autonomous vehicles in a swarm while the autonomous vehicle 220 travels and performs tasks. In some embodiments, the autonomous vehicle 220 may be configured to autonomously travel and perform tasks for extended periods of time (e.g. hours, days) without communicating with another vehicle or with a central server. In some embodiments, the communication device 225 may be configured to allow the autonomous vehicle 220 to communicate on the network 110 described with reference to FIG. 1.

The sensor system 227 may comprise one or more navigation and/or data collection sensors. In some embodiments, the sensor system 227 may comprise one or more sensors for capturing data around the autonomous vehicle 220 to assist in avoiding obstacles and other vehicles while the autonomous vehicle 220 take off, travel, and land. In some embodiments, the sensor system 227 may include other navigation sensors such as a magnetometer, an accelerometer, an altitude sensor, a gyroscope, radar, an optical sensor, and the like. In some embodiments, the sensor system 227 may comprise one or more environmental sensors such as a wind sensor, a light sensor, an optical sensor, a visibility sensor, a weather sensor, a barometric pressure sensor, a range sensor, a humidity sensor, a sound sensor, a thermal image sensor, a night vision camera, etc.

The block diagram in FIG. 2 comprises a simplified block diagram of an autonomous vehicle. Several components of vehicles such as a power source, a chassis, landing gears, etc. are omitted.

Figure 3:
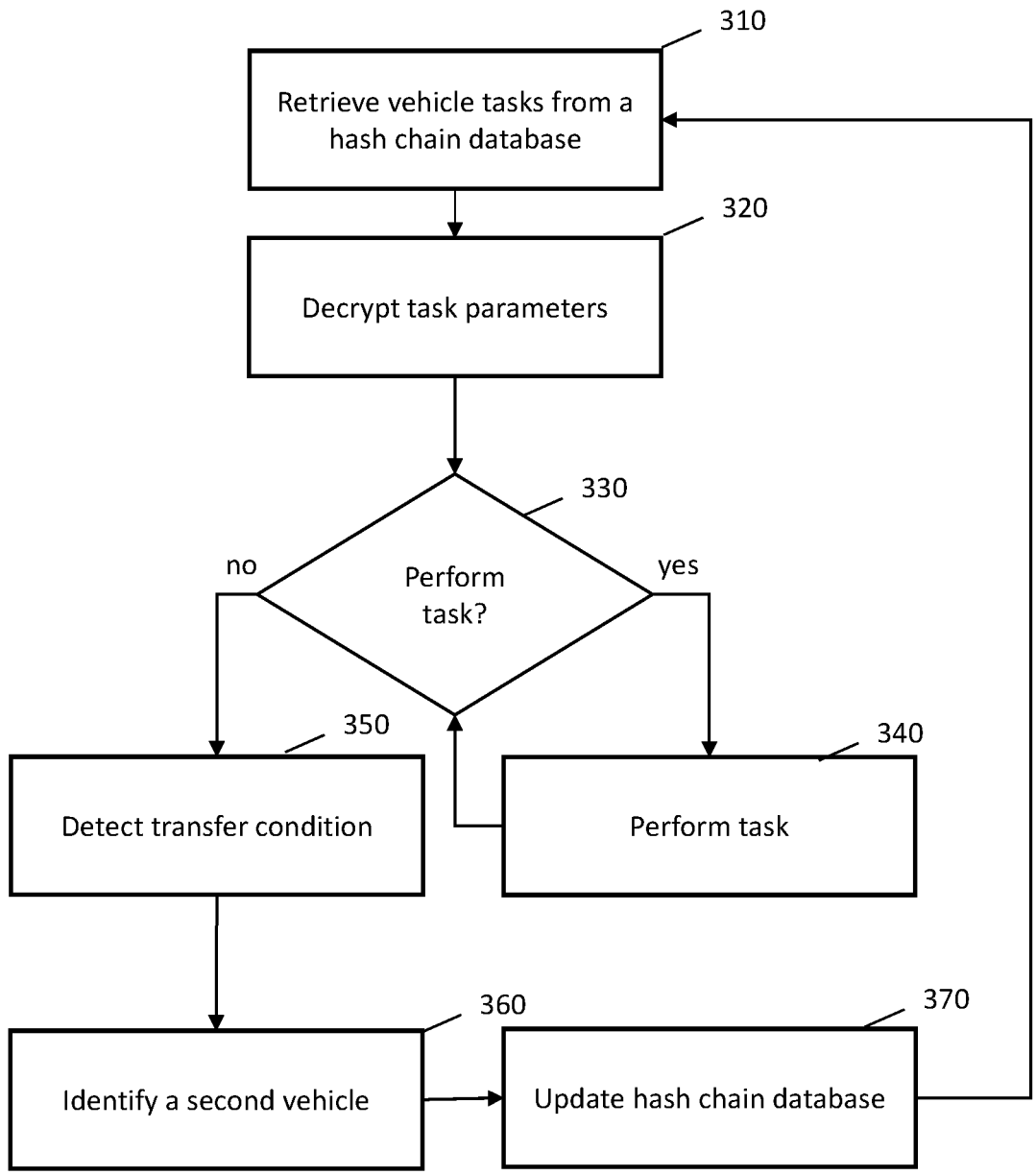
FIG. 3 is a flow diagram of a method in accordance with several embodiments.

Referring now to FIG. 3, a method of managing autonomous vehicles is shown. In some embodiments, the steps shown in FIG. 3 may be performed by a processor-based device, such as one or more of the autonomous vehicle 120 and the server system 130 described with reference to FIG. 1, the autonomous vehicle 220 described with reference to FIG. 2, or other similar devices. In some embodiments, the steps may be performed by one or more of a processor of an autonomous vehicle, an unmanned vehicle, a processor of a central computer system, and/or a processor device of a server system.

In step 301, the system retrieves tasks from a hash chain database. In some embodiments, the one or more vehicle tasks may be assigned to the first autonomous vehicle stored through a hash chain database associated with the autonomous vehicle fleet. In some embodiments, a hash chain database comprises a chain of records in which each block in the chain comprises a hash of a previous block. In some embodiments, the hash chain database may be distributed database maintained by nodes comprising autonomous vehicles and/or a server system. The nodes of the distributed database may collectively update and verify the updates to the distributed database. In some embodiments, task parameters of the one or more vehicle tasks may be at least partially encrypted with a public key of the first autonomous vehicle such that it is only visible to the first autonomous vehicle. In some embodiments, a task record in the hash chain database may comprise an encrypted portion and an unencrypted portion. For example, the parameters and authorizations required to perform a task may be encrypted and only accessible to the vehicle(s) assigned the task, while general task information and assigned vehicle information may be unencrypted and visible to other vehicles and systems that share the hash chain database. In some embodiments, a vehicle task may comprise a task that can be carried out by an autonomous vehicle, for example, traveling to a destination, delivering a package, transporting a passenger, gathering data, processing data, performing surveillance, leading a swarm of autonomous vehicles, and the like. In some embodiments, the vehicle task may comprise tasks performed by one or more members of an autonomous vehicle swarm. In some embodiments, a task may be assigned to a vehicle by a central server, by a master vehicle and/or be transferred from another vehicle.

In some embodiments, an autonomous vehicle fleet may refer to a swarm of vehicles, a group of vehicles traveling together, a group of vehicles operating under a shared task agreement, and/or a group of geographically distributed vehicles. In some embodiments, a vehicle fleet may comprise active and/or standby vehicles. In some embodiments, one or more vehicles in the fleet may be configured to operate independently when not in the fleet and/or may join different fleets at different times. In some embodiments, vehicles may join and leave a fleet based on one or more of vehicle location, vehicle task assignment, vehicle condition, travel condition, and the like. In some embodiments, task parameters may comprise information on how to perform a task such as a task identifier, a destination, a default path, cargo to be carried, cargo weight, data to be collected, path restrictions, task performance history, and the like. In some embodiments, task parameters may comprise vehicle requirements and/or preferences for the task such as vehicle hardware capability, vehicle processing capability, vehicle load capacity, vehicle speed, vehicle range, vehicle type (e.g. UAV vs. UGV), onboard sensors, etc. In some embodiments, task parameters may comprise travel authorizations for one or more of airspace, roadway, and waterway.

In some embodiments, the hash chain database may comprise one or more of a set of hashed records, a distributed database, a distributed ledger, a blockchain database, and the like. In some embodiments, the hash chain database may be implemented as a distributed database comprising onboard memory devices of a plurality of autonomous vehicles in the autonomous vehicle fleet. In some embodiments, the hash chain database may be stored on a remote server and the first autonomous vehicle may be configured to retrieve at least a portion of the hash chain database and/or the one or more vehicle tasks from the remote server via a communication device. In some embodiments, the hash chain database comprises a blockchain in which each block corresponds to one or more vehicle tasks. In some embodiments, updates to the hash chain database may be broadcasted from one vehicle to one or more other systems, and updates to the database may be governed by consensus rules enforced by the vehicles in the fleet. In some embodiments, the first autonomous vehicle may download at least a portion of the hash chain database to a local memory device prior to step 310. In some embodiments, step 310 may comprise searching through the hash chain database for records associated with one or more of a public key, a vehicle identifier, and task identifiers associated with the first vehicle. In some embodiments, the system may only search through new records added to the hash chain database since the last time a scan of the database is performed. In some embodiments, the validity of new records may be checked using older records in the hash chain database. For example, the vehicle may verify that a task is assigned by an authorized entity (e.g. master vehicle, prior task owner, central server, etc.) based on prior records in the hash chain database.

In step 320, the system decrypts the task parameters for the task retrieved in step 310. In some embodiments, the task parameters are decrypted using a private key of the first autonomous vehicle based on asymmetric key cryptography. In some embodiments, public keys of a vehicle in a fleet may be shared with one or more other vehicles in the fleet and/or with a central server. In some embodiments, when a server or another vehicle assigns a task to the first vehicle, the task parameters are encrypted with the public key associated with the first vehicle and stored as an update in the hash chain database.

In step 330, the system determines whether to perform the one or more vehicle tasks. In some embodiments, the task may be performed by one or more of a locomotion, navigation, sensor, and data processing system of the first autonomous vehicle. In some embodiments, step 330 comprises verifying that the assigned task complies with rules of the fleet as specified in the hash chain database. For example, rules of the fleet may comprise restrictions on actions that a vehicle can perform while being part of the fleet, such as restrictions on geographical boundaries, top speed, flying altitude, path, permitted cargo, etc. In some embodiments, step 330 comprises verifying that the task has been assigned by an authorized entity. For example, the vehicle may check that the task was transferred from another authorized vehicle in the fleet, from a verified central server, and/or from a verified master vehicle of the fleet. In some embodiments, step 330 may be determined based on one or more of the vehicles' other assigned tasks, location, hardware capability, processing capability, load capacity, top speed, fuel range, vehicle type (e.g. UAV vs. UGV), onboard sensors, etc. In some embodiments, the system checks the requirements of the task in the task parameters and determine whether it can carry out at least a portion of the task. For example, the vehicle may determine whether it has enough fuel to carry a package to the next hand-off location on the delivery route. In some embodiments, step 330 may comprise determining whether another vehicle in the fleet is more suitable for performing the task. In some embodiments, steps 330 and 350 may be combined and the system may determine that a vehicle should not perform a task because task transfer condition exists If the vehicle determines that it should carry out at least part of the task based on the task parameters retrieved from the hash chain database, the vehicle performs the task in step 340. In some embodiments, during a performance of a task, the system may repeat step 330 and/or perform step 350 to determine whether the vehicle should continue to perform the task. For example, if, while carrying out a task, the vehicles estimates that it does not have enough power reserve to complete the task, the system may proceed to transfer the task at step 350. In some embodiments, the vehicle may continue to perform a task until a transfer can take place.

In step 350, the system detects for task transfer condition. In some embodiments, a task transfer condition refers to a set of conditions, when met, allows and/or requires the vehicle to transfer an assigned task to another vehicle. In some embodiments, the task transfer condition is determined based on one or more of other assigned tasks, fuel level, vehicle condition, vehicle location, vehicle capability, weather condition, and task requirements. In some embodiments, task transfer condition may comprise conditions relating to the status of the vehicle assigned to perform the task, environmental conditions, and/or conditions associated with the availability of transferee vehicles. In some embodiments, task transfer conditions may be task specific and may be defined in the task profile and/or task parameters stored in the hash chain database. In some embodiments, task transfers may occur due to unexpected conditions, such as vehicle failure and damages, and allows another vehicle to take over and carry on the task. For example, if a UGV gets a flat tire and is unable to continue to travel, the UGV may determine that one or more of its assigned task should be transferred to another vehicle. In some embodiments, task transfers may comprise a prescheduled/predetermined transfer that uses a plurality of vehicles to tag-team and carry out a single task. For example, a faster but noisier UAV may hand off a delivery task to a quieter but slower UAV when approaching a residential area. In some embodiments, if a vehicle determines that it cannot perform a task and task transfer conditions are not met, the task may revert back to the original assignee/transferor and/or a central server may be notified.

In step 360, the system identifies a second vehicle to transfer the task. In some embodiments, the second autonomous vehicle may be automatically identified by the first autonomous vehicle in response to the task transfer condition being detected. In some embodiments, the second autonomous vehicle may be identified as a transferee of the one or more vehicle tasks based on transfer rules in the task parameters. In some embodiments, the transfer rules may specify requirements and preferences for the second autonomous vehicle's capability and status. In some embodiments, the transfer rules may comprise an equation for rating/ranking autonomous vehicles for their suitability for performing a task. The first vehicle may first determine which other vehicles in the fleet meet the requirements of the task profile and rank the vehicles based on the preferences equation in the task profile to select a second autonomous vehicle. In some embodiments, one task may be assigned to multiple vehicles. For example, a data collection task for an area may be divided into regions and assigned to two or more vehicles to perform. In some embodiments, step 360 further comprises authenticating the second autonomous vehicle as a member of the autonomous vehicle fleet based on vehicle registry information stored in the hash chain database and prevent unauthorized access and/or modification of the hash chain database. In some embodiments, one or more records in blocks in the hash chain database comprise autonomous vehicle capability and status information, and the second autonomous vehicle is identified as the transferee of the one or more vehicle tasks based on the autonomous vehicle capability and status information stored in the hash chain database. In some embodiments, vehicle status and capability information may be updated by vehicles in a fleet and shared among the vehicles.

In step 370, the vehicle updates the hash chain database to transfer one or more tasks to the second vehicle selected in step 360. In some embodiments, the update is added to a new block comprising a hash of preceding data in the hash chain database and the task parameters of the one or more vehicle tasks. In some embodiments, the task parameters are at least partially encrypted with a public key of the second autonomous vehicle. In some embodiments, the task parameters may be updated based on the first vehicle's performance of the task. For example, a starting location of the task may be updated to reflect the expected hand-off location of the transfer. In some embodiments, the new block further comprises vehicle state parameters of the first autonomous vehicle, wherein the second autonomous vehicle is configured to apply the vehicle state parameters of the first autonomous vehicle to the second autonomous vehicle to perform the one or more vehicle tasks. In some embodiments, the new block further comprises task status information for the one or more vehicle tasks, the task status information being configured to allow the second autonomous vehicle to resume a partially completed task. In some embodiments, the task parameters may comprise a path authorization. For example, flight path registrations/authorizations with Air Traffic Control (ATC) for a UAV tail number may be transferred to the second vehicle's tail number with the transfer of the task. In some embodiments, traffic controlling entities (e.g. ATC, building security, community gate security, toll booth, harbor authority, etc.) may access the hash chain and automatically update the registration when the hash chain database is updated to reflect the task transfer. In some embodiments, a web server may index the hash chain database to provide the traffic controlling entities with the latest vehicle identifier associated with each path authorization/registration issued.

In some embodiments, the update to the hash chain database may comprise a database update broadcasted to one or more autonomous vehicles in the autonomous vehicle fleet via a communication device on the first autonomous vehicle. In some embodiments, one or more vehicles in the fleet are configured to serve as nodes of the distributed database and verify that the update to transfer the task complies with the transfer conditions of the task and/or fleet consensus rules. In some embodiments, the transfer of a task may be similar to the transfer of a digital currency in a cryptocurrency system such as BitCoin. For example, the nodes of the hash chain database may verify that the transferor vehicle was the last owner of the task and that task has not been previously transferred ("double spent") to another vehicle.

In some embodiments, vehicles in a fleet sharing a hash chain database may each carry out the steps described in FIG. 3 to perform tasks assigned through the hash chain database and update the hash chain database continuously. For example, after step 370, when the second autonomous vehicle performs step 310, the newly transferred task would be retrieved and decrypted with the private key of the second vehicle. The second vehicle may then proceed through the steps of FIG. 3 with the newly transferred task. The first vehicle may also return to step 310 to retrieve additional tasks to perform and/or transfer. While various steps of FIG. 3 refer to autonomous vehicles, in some embodiments, the process may also be applied to semi-autonomous and manually driven vehicles. For example, when a person rents a car, task parameters specifying the driver's preferences and settings (e.g. seat position, radio station presets, A/C setting, mirror position) may be transferred and applied to the rental vehicle.

Figure 4:
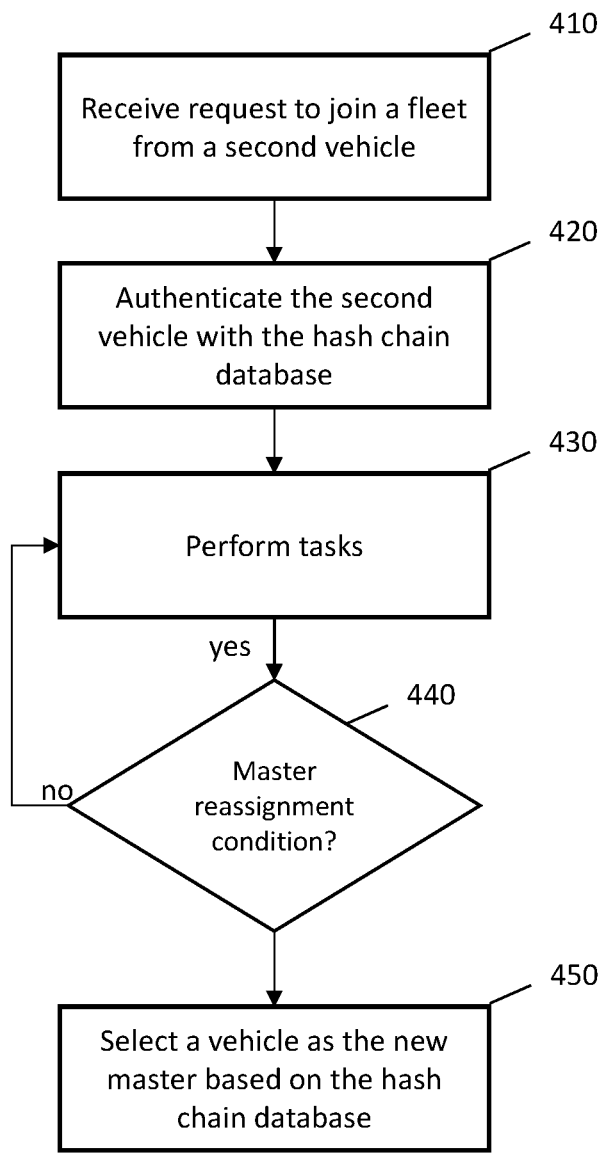
FIG. 4 is a flow diagram of a method in accordance with several embodiments.

Referring now to FIG. 4, a method of managing autonomous vehicles is shown. In some embodiments, the steps shown in FIG. 4 may be performed by a processor-based device such as one or more of the autonomous vehicle 120 and the server system 130 described with reference to FIG. 1, and the autonomous vehicle 220 described with reference to FIG. 2 herein or similar devices. In some embodiments, the steps may be performed by one or more of a processor of an autonomous vehicle, an unmanned vehicle, a processor of a central computer system, and/or a processor device of a server system.

In step 410, a system receives a request from a second autonomous vehicle to join the autonomous vehicle fleet. In some embodiments, the request may comprise a wireless communication signal broadcasted and/or directed to one or more vehicles in the fleet. In some embodiments, a vehicle in a master role ("master vehicle") and/or one or more other vehicles in the fleet may be configured to authorize the second autonomous vehicle. In some embodiments, the authentication request may comprise one or more of a vehicle identifier, an authorization passcode, vehicle capabilities, a public key, and a signature of the second vehicle.

In some embodiments, an autonomous vehicle fleet may refer to a swarm of vehicles, a group of vehicles traveling together, a group of vehicles operating under a shared task agreement, and/or a group of geographically distributed vehicles. In some embodiments, a vehicle fleet may comprise active and/or standby vehicles. In some embodiments, one or more vehicles in the fleet are configured to operate independently when not in the fleet and/or may join different fleets at different times. In some embodiments, vehicles may join and leave a fleet based on one or more of vehicle location, vehicle task assignment, vehicle condition, travel condition, and the like. The fleet may comprise a master autonomous vehicle configured to coordinate tasks assigned to vehicles in the autonomous vehicle fleet. In some embodiments, other vehicles ("slave vehicle") in the fleet may only recognize tasks assigned by the master vehicle. In some embodiments, tasks that are unable to be performed or left uncompleted for an extended period of time by a slave vehicle may revert back to the master vehicle to be reassigned. In some embodiments, at least of a portion of the fleet vehicles' status, capability, and task assignment information may be shared only with the master vehicle in the fleet. In some embodiments, a master autonomous vehicle of the autonomous vehicle fleet may be configured to issue commands and/or assign tasks to other autonomous vehicles in autonomous vehicle fleet based on one or more of: capabilities of each autonomous vehicle, current statuses of each autonomous vehicle, current task assignments of each autonomous vehicle, current weather condition, current flight conditions, flight sensor data from one or more autonomous vehicles, and communications with a central computer system. In some embodiments, instructions and task assignments may be communicated through wireless communication, wireless messaging, encrypted messages, a hash chain of vehicle tasks, and/or through blockchain based communication. In some embodiments, autonomous vehicles in the autonomous vehicle fleet may be configured to verify that a task and/or a command is assigned by a master autonomous vehicle of the autonomous vehicle fleet prior to performing the task and/or the command In some embodiments, the hash chain database may comprise one or more of hashed records, a distributed database, a distributed ledger, a blockchain database, and the like. In some embodiments, the hash chain database may store one or more of master reassignment rules, current master vehicle identity, current status and capabilities of vehicles in the fleet, vehicle authentication requirements, and fleet task assignments. In some embodiments, the hash chain database is stored on a distributed database comprising onboard memory devices of a plurality of autonomous vehicles in the autonomous vehicle fleet. In some embodiments, the hash chain database is stored on a remote server and the master autonomous vehicle is configured to retrieve the hash chain database and/or the one or more vehicle tasks from the remote server via a communication device. In some embodiments, the hash chain database comprises a blockchain in which each block comprises one or more vehicle tasks. In some embodiments, updates to the hash chain database may be broadcasted from one vehicle to one or more other systems, and updates may be governed by consensus rules collectively enforced by the vehicles in the fleet. In some embodiments, one or more vehicles in the fleet are configured to serve as nodes of the distributed database and verify that updates to the hash chain database comply one or more of fleet rules, master reassignment rules, and master selection rules. In some embodiments, the transfer of a master role may be similar to the transfer of a digital currency in a cryptocurrency system such as BitCoin. For example, the nodes of the hash chain database may verify that the master role can only be transferred once to one other vehicle (e.g. no "double spent") such that only one master vehicle is recognized by the fleet at a time. In some embodiments, the autonomous vehicles may download at least a portion of the hash chain database to a local memory device prior to step 410.

In step 420, the system authenticates the second vehicle. In some embodiments, the second vehicle may be authenticated based on fleet rules stored in a hash chain database. For example, the hash chain database may comprise a list of public keys associated with preauthorized vehicles and the second autonomous vehicle may be required to provide a signature signed by a corresponding private key to authenticate itself. In some embodiments, the hash chain database may comprise one or more of vehicle identifiers, manufacturer identifiers, owner identifiers, and capability identifiers associated with recognized vehicles/entities that can be used to authorize a new vehicle into the fleet. In some embodiments, vehicles may be added to different levels of authentication in step 420. For example, a third party vehicle may be authorized to travel with a swarm and assist in the swarm navigation but may not be permitted to become the master vehicle of the fleet. In another example, a third party vehicle may be authorized to follow the swarm and retrieve navigation instructions but may not be assigned delivery tasks from the fleet. In some embodiments, the system is further configured to update the hash chain database to add the second autonomous vehicle to the autonomous vehicle fleet.

In some embodiments, the update may comprise the second vehicle's information, status, specifications, and/or authentication level. In some embodiments, the update may make the public key and/or current status of the newly added vehicle accessible to at least the master vehicle of the fleet.

In step 430, the vehicles in the fleet continue to perform tasks with the addition of the second autonomous vehicle added in step 420. In some embodiments, in step 430, the master vehicle of the fleet may begin to provide instructions and/or assign tasks to the second autonomous vehicle as the fleet collectively navigate and/or perform a plurality of tasks. For example, the master vehicle may assign only vehicles in the front of a swarm to turn on their headlights while traveling through a tunnel. In another example, when traveling on a narrow path, the master vehicle may instruct the vehicles to travel in a single file instead of two or three abreast. In some embodiments, one or more vehicles may leave the fleet while the fleet travels and/or performs tasks. For example, a delivery vehicle may travel with a swarm for the first part of the journey and leave the swarm on the last mile to complete the delivery. In some embodiments, that vehicle may rejoin the same fleet or join another fleet after it drops off the package to travel to its next destination or home base.

In some embodiments, step 440, the system determines whether master reassignment conditions are present. In some embodiments, the master reassignment condition comprises one or more of: a new autonomous vehicle having specified capability, a current master autonomous vehicle leaving the autonomous vehicle fleet, and the current master autonomous vehicle being low on power. In some embodiments, the master reassignment condition may be detected by the current master vehicle of the fleet. For example, the master vehicle may determine that its power level is too low to continue to function as the master vehicle and proceed to step 450 to transfer the master role to another vehicle. In some embodiments, the master role may comprise a "task" that may be transferred according to the process described with reference to FIG. 3 wherein the master reassignment condition comprises the task transfer condition. In some embodiments, one or more vehicles in the fleet may independently detect for master reassignment condition based on their communications with other vehicles in the fleet and/or based on the information stored in the hash chain database. For example, if the master vehicle loses communication with the fleet, the remaining vehicles may proceed to step 450 to select a new master vehicle. In another example, if the master vehicle is scheduled to leave to swarm to perform delivery, the vehicles may proceed to step 450 to select a new master before the current master leaves the swarm. In some embodiments, master reassignment condition may be determined based on consensus rules of the fleet. For example, at least a percentage (e.g. 51%, 80%, 90%) of the vehicles in the fleet need to agree that the master reassignment condition exists and a new master needs to be selected.

In step 450, the system selects an autonomous vehicle in the autonomous vehicle fleet as a new master autonomous vehicle. In some embodiments, the selection may be based on master assignment rules stored in the hash chain database. In some embodiments, the new master autonomous vehicle is selected based on one or more of processing capabilities, communication capabilities, flight capabilities, cargos, power levels, destinations, authentication levels, and current task assignments of a plurality of autonomous vehicles in the autonomous vehicle fleet. In some embodiments, the new master may be selected by the current master vehicle of the fleet. In some embodiments, one or more vehicles in the fleet may independently select a new master based on their communications with other vehicles in the fleet and/or based on the information stored in the hash chain database. In some embodiments, a new master may be selected based on consensus rules of the fleet. For example, at least a percentage (e.g. 51%, 80%, 90%) of the vehicles in the fleet need to agree on the selection of the new master. In some embodiments, a vehicle in the fleet may only acknowledge a new master and accept tasks and instructions from a new master if the vehicle has independently detected the master reassignment condition and/or selected the new master according to rules and vehicle information stored in the hash chain database.

In some embodiments, a master vehicle and/or the vehicles in the fleet may periodically appoint a "deputy" master vehicle or determine a "line of succession" among the vehicles in the fleet based on master reassignment rules in the hash chain database. When a master reassignment condition is detected in step 440, the master rule may be passed on to the preselected deputy or the next vehicle in the line of succession in step 450. In some embodiments, the deputy master vehicle may be given access to a copy of the master vehicle data block that allows the deputy to act in the role of the master, but the vehicles would not recognize instructions from the deputy until master reassignment condition is detected in step 440. In some embodiments, a central system may keep a copy of the master vehicle data block that is transferred to the deputy when master reassignment condition is detected in step 440.

In some embodiments, the master role is transferred to the new master autonomous vehicle when a previous master autonomous vehicle and/or a central computer system updates the hash chain with master vehicle data encrypted with a public key of the new master autonomous vehicle, the master vehicle data comprises credentials that allow the new master autonomous vehicle to assign tasks to other autonomous vehicles. In some embodiments, the master vehicle data may be transferred similarly as a cryptocurrency (e.g. BitCoin) and vehicles serving as nodes of the distributed database may be configured to verify that only one vehicle possess the master vehicle role at a time (e.g. no double spending). In some embodiments, the new master autonomous vehicle is provided with public keys of a plurality of autonomous vehicles in the autonomous vehicle fleet via the master vehicle data and/or hash chain database and is configured to assign tasks to the plurality of autonomous vehicles by updating the hash chain database with task assignments encrypted with public keys of assigned autonomous vehicles. In some embodiments, a master may assign some tasks and/or provide navigation instructions via wireless communication, wireless messaging, encrypted messages, a hash chain of vehicle tasks, and/or through blockchain based communication.

Figure 5:
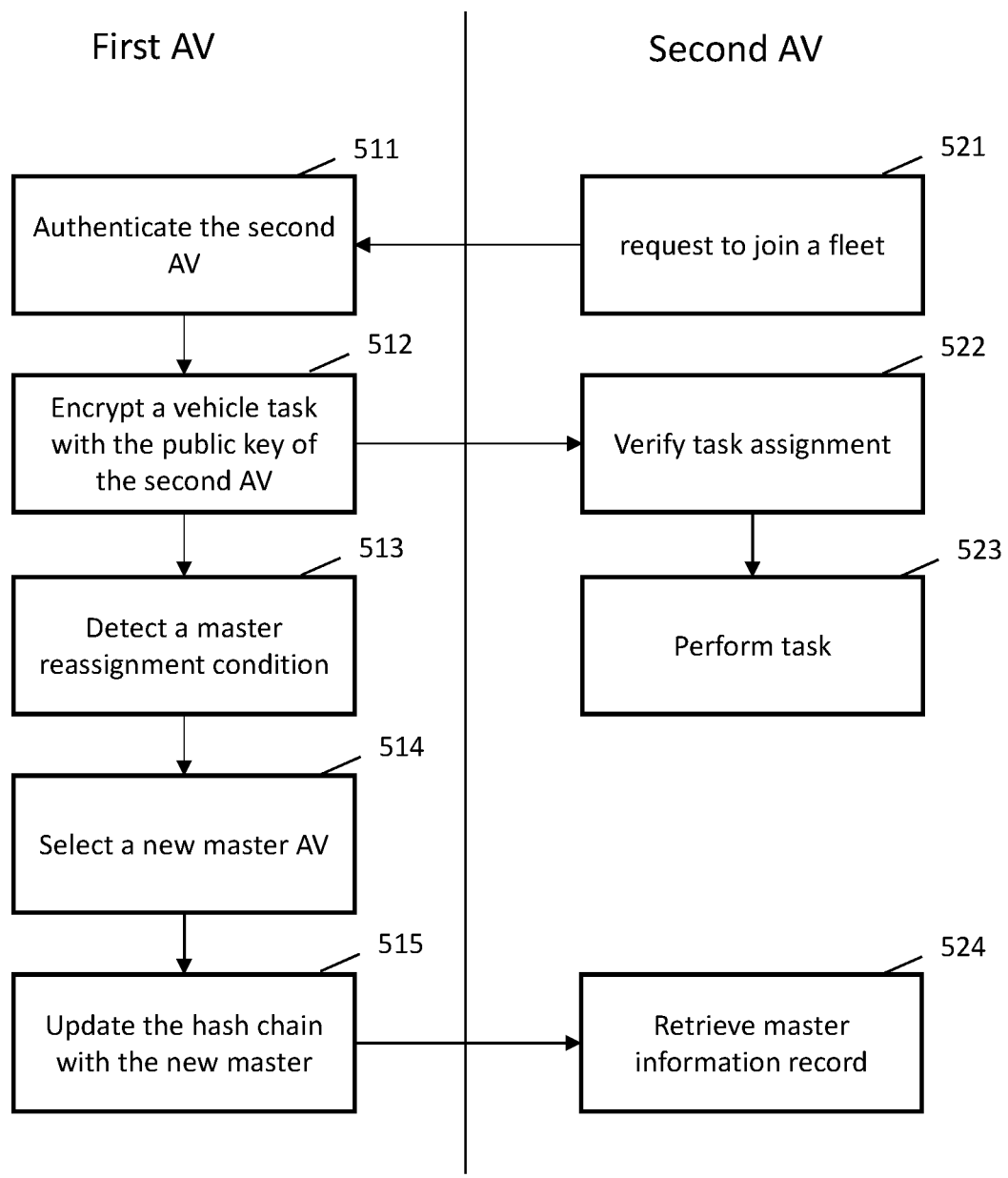
FIG. 5 is a process diagram of a process in accordance with several embodiments.

Referring now to FIG. 5, a method of managing autonomous vehicles is shown. In some embodiments, the steps shown in FIG. 5 may be performed by a processor-based device, such as one or more of the autonomous vehicle 120, the server system 130 described with reference to FIG. 1, and the autonomous vehicle 220 described with reference to FIG. 2 herein or similar devices. In some embodiments, the steps may be performed by one or more of a processor of an autonomous vehicle, an unmanned vehicle, a processor of a central computer system, and/or a processor device of a server system.

In FIG. 5, the first autonomous vehicle (AV) represents the original master of an AV fleet. In step 521, the second AV requests to join the fleet and sends a request to the first AV.

In some embodiments, the request may be directed to the master vehicle of a fleet and/or be broadcasted to a plurality of vehicles in a fleet. In some embodiments, step 521 may comprise step 410 or a similar process. In step 511, the first AV authenticates the second AV. In some embodiments, step 511 may comprise step 420 or a similar process. In some embodiments, the public key of the second AV may be provided to the first AV and/or stored in a hash chain database in step 511 or 521.

In step 512, the first AV encrypts a vehicle task with the public key of the second AV. In some embodiments, the first AV may select one or more tasks for the second AV based on the second AV's capability, power level, assigned tasks, location, etc. The assigned vehicle task may be added as a new record of a hash chain database. In some embodiments, the first AV may further sign the task assignment with its private key.

In step 522, the second AV verifies the task assignment. In some embodiments, the verification comprises verifying that the assignment came from the current master vehicle of the fleet. In some embodiments, the verification may comprise verifying the first AV's signature in the task assignment record. In some embodiments, the verification may comprise verifying that the first AV is the current owner of a master vehicle data block. In some embodiments, the verification may comprise checking the task against fleet rules stored in a database. In some embodiments, one or more vehicles in the fleet may verify task assignments prior to adding the task to the hash chain database. If the task assignment is verified by the second AV, the second AV carries out the task in step 523.

In step 513, the first AV detects a master reassignment condition. In some embodiments, step 513 may comprise step 440 or a similar process. In some embodiments, the second AV and/or other vehicles in the fleet may also detect for or verify the master reassignment condition based on fleet rules in a hash chain database. In step 514, the first AV selects a new master AV. In some embodiments, step 514 may comprise step 450 or a similar process. In some embodiments, the second AV and/or other vehicles in the fleet may also detect for or verify the master selection based on fleet rules in a hash chain database.

In step 515, the first AV updates the hash chain database with the new master's information. In some embodiments, the update may comprise transferring a master block to the selected new master, similar to the transfer of a cryptocurrency (e.g. Bitcoin). In some embodiments, the block may comprise master information record configured to allow the new master to issue tasks and instructions to the other vehicles in the fleet. In some embodiments, the master information record may comprise public keys of one or more vehicles in the fleet and/or other authentication information. In FIG. 5, the master role is transferred to the second AV. In step 524, the second AV retrieves the master information record from the hash chain database. The second AV may decrypt the master information record with its private key and assume the role of the master using the information in the master information record to issue tasks to other vehicles in the fleet.

In some embodiments, an autonomous vehicle is configured to "handshake" with third party autonomous vehicles. The handshake may allow the vehicles to confirm the transfer of goods, collaborate on tasks, travel together, and/or have one vehicle modify the operation of another vehicle. For example, a UGV may hand off its mission profile to another vehicle to perform. With the handshake, a vehicle can also be "cloned" with the parameters of another autonomous vehicle. The parameters can include customer configurations for the vehicle, electronics, lighting, etc. For example, a customer may clone the parameters of their personal car onto a rental vehicle. The vehicle parameters may also be copied from preconfigured sets such as celebrities' cars, specialized theme, etc. In some embodiments, a "handshake" between vehicles may be performed using blockchain based communication.

Multi-robotic systems (MRS) are complex networks that facilitate the interaction between autonomous robotic agents according to specific rules of behavior in order to perform a specific function or a combination of functions. In some embodiments, the systems and methods described herein provide an MRS that is dynamic, interactive, evolving, environmentally adaptive, and capable of exhibiting emergent behavior. In some embodiments, the system comprises a hybrid of behavior-based and centrally-panned control processes in a distributed network environment.

In some embodiments, autonomous vehicles in a fleet may comprise nodes of a distributed computing network. Decision-making in the distributed computing network may comprise a pruning process that uses pre-determined (or changing) rules and/or by a vote among the nodes. In some embodiments, simple flocking rules for local reactive behaviors may comprise one or more of (a) fly at a steady state speed among neighbors, (b) tend to the center of the flock, and (c) avoid collisions with neighbors. In some embodiments, local reactive behaviors may be comparable to driving on highways wherein cars and/or drivers have limited information (visibility) restricted primarily to nearest neighbors. For example, cars and/or drivers would generally seek to avoid collisions but also maintain a consistent pace.

In some embodiments, the selection of a transferee autonomous vehicle may be based on each candidate vehicle's capabilities (e.g. weight capability, speed, vehicle type, etc.) and status (e.g. current location, remaining power, current task assignments, etc.). In some embodiments, the transferor vehicle and/or the transferee vehicle may assess the transferee's capability before transferring the task. In some embodiments, tasks may comprise capability requirements and/or preferences. In some embodiments, one or more vehicles may rank candidate vehicles based on the requirements and/or preferences of the task and the capabilities and/or statuses of the candidate vehicles. In some embodiments, one or more vehicles may determine confidence levels for candidate vehicles based on the requirements and/or preferences of the task and the capabilities and/or statuses of the candidate vehicles. In some embodiments, a transferee vehicle may be selected based on the confidence level determined by one or more vehicles in the fleet. In some embodiments, vehicle capability and current status information may be stored in a hash chain database. In some embodiments, one or more vehicles may be configured to periodically update a distributed database with its status information such as task assignment, current location, current route, power level, carried weight, carried equipment, etc.

In some embodiments, a task profile may comprise route approval and air traffic control (ATC) communication tower information that may be transferred between vehicles. In some embodiments, the ATC may be able to view the transfer of tasks between vehicles in the blockchain to determine whether a specific vehicle carries the route authorization for an airspace. In some embodiments, a web service may be provided to index each task transfer recorded in the blockchain. The web service may then provide the ATC with the latest vehicle identifier (e.g. tail number, license plate, etc.) associated with each task and/or route approval.

In some embodiments, one or more vehicles may broadcast task transfers to ATC to indicate that the tail number associated with a route/task should be replaced by another tail number. In some embodiments, the task profile may "clone" a vehicle's parameters to another vehicle. In some embodiments, the cloning could be time or geographic limited (revert to old parameters subsequently). In some embodiments, the parameters may comprise customized configuration of cars, electronics, etc. In some embodiments, parameters from celebrities' cars, electronics, lighting, etc. may be copied through vehicle parameter "cloning."

In some embodiments, the system uses blockchain based communication to permit a group of autonomous vehicles to authenticate one another and negotiate a master/slave hierarchy among the vehicles. In some embodiments, in a fleet of autonomous vehicles, the leader of the feel may change as the flock traverses along the route and divides/merges. In some embodiments, an initial blockchain may be associated with the whole flock. In some embodiments, the autonomous vehicles may be self-aware.

In some embodiments, a group of autonomous vehicles in a "flock" may be configured to authenticate each other and negotiate a master/slave hierarchy for the group. The "master" of the flock can lead the flock on a path and/or assign tasks to other vehicles. In some embodiments, the master/slave rules may be defined in a blockchain shared by the vehicles. In some embodiments, when vehicles join or leave the flock, the leader role of the flock may be renegotiated and changed. For example, if the current leader leaves the flock, the vehicles may look into the rules in the blockchain to determine which vehicle should take on the leader role. In some embodiments, each deviation or addition from the original mission may be recorded in an additional block or a record in the blockchain. For example, when a specific autonomous vehicle is assigned certain tasks, the task assignment may be recorded in a block. Vehicles engaging in a task using sensors may refer to the previous blocks of information to view previous decisions involving other vehicle's sensors.

In some embodiments, when two or more vehicles are working to accomplish one or more missions, blockchain based communication allows the creation and maintenance of a super-entity beyond the sub-entity of individual autonomous vehicles. In some embodiments, individual vehicles that are slaves to a group of vehicles may be configured to choose actions that prioritize to the group over themselves. For example, an individual vehicle may avoid collisions when traveling alone, but when traveling as part of a flock, the vehicle may take the impact to protect the greater whole. In another example, whereas the optimal route for an individual vehicle traveling to a drop off spot may be a straight line, the optimal path in context with the entity that is a group of vehicles may be curved. In some embodiments, a vehicle fleet blockchain may comprise information that allows a vehicle to autonomously decide how it will optimize its actions from store to door and back, whether it is traveling together or apart from other vehicles to deliver a package or perform some other assigned task.

In some embodiments, the systems and methods described herein use blockchain based communication to authenticate vehicles joining a fleet. In some embodiments, vehicles may be added to the fleet at different levels of authentication. In some embodiments, when a vehicle joins a fleet, the new vehicle may record its public key to a shared hash database such that other vehicles in the fleet may carry out encrypted communication with the new vehicle. In some embodiments, one or more autonomous vehicles may comprise a communication device for peer-to-peer communication, one or more navigation sensors, a central processing unit (CPU), and/or a graphical processing unit (GPU). In some embodiments, when a vehicle is added to the fleet, a new record may be added to the hash chain comprising the authorization and the new vehicle information. In some embodiments, updates to the hash chain database may be verified by at least the master vehicle of the fleet. In some embodiments, in addition to assigning a master vehicle in a fleet, the deputy master may be selected by either the master vehicle and/or collectively by the fleet. In some embodiments, the deputy master may assume the role of the master if the master vehicle unexpectedly or temporarily loses communication with other vehicles of the fleet. In some embodiments, at least some of the vehicle may not perform the computations needed to update the shared hash chain, and instead, retrieve indexed information from another vehicle and/or a central server. In some embodiments, the vehicles are configured to carry out a task and/or respond to environmental changes independently when separated from the fleet.

In some embodiments, the master role may be assigned based on battery level, processing capability, navigation capability, authorization level, etc. In some embodiments, the master reassignment may be performed to reduce the power consumption of the currently assigned master vehicle. In some embodiments, vehicles traveling in a flock may fly in formation and share sensor and signaling tasks. For example, the master vehicle may assign only the vehicles in the front of the flock to turn on headlines to conserve power of vehicles traveling behind them. In some embodiments, the master vehicle may assign a selected few vehicles to communicate with a remote server with a long range communication device while the remaining vehicles retrieve information by communicating with the select vehicles. For example, one vehicle may turn on its mobile data network transceiver while a number of other vehicles may tether to it via Wi-Fi or Bluetooth. In some embodiments, the master vehicle may assign and unassigned tasks to other vehicles in the fleet via a blockchain. In some embodiments, the master may instruct a plurality of slave vehicles in a flock to collectively perform a task. In some embodiments, the task assignments may automatically revert back to the master if a predetermined time period passes or if the fleet leaves an associated area. In some embodiments, the master vehicle may store public keys of each vehicle in the fleet on its local drive and/or in a distributed hash chain database. The public keys of a vehicle may be used by the master to transfer a task assignment to the vehicle. In some embodiments, one or more vehicles in a fleet may further be configured to transfer a task to a third party vehicle or a vehicle not in the fleet, as long as the transfer is consistent with the transfer rules of the task profile. In some embodiments, one or more vehicles in a fleet may maintain at least periodic communication with a remote server as a failsafe authentication method for identifying and authenticating masters and other vehicles in the fleet. In some embodiments, the task assigned from a master vehicle to a slave vehicle may comprise data collection and/or data processing tasks.

Descriptions of some embodiments of blockchain technology are provided with reference to FIGS. 6-11 herein. In some embodiments of the invention described above, blockchain technology may be utilized to record autonomous vehicle task transfers and master role reassignments. One or more of the autonomous vehicles and servers described herein may comprise a node in a distributed blockchain system storing a copy of the blockchain record. Updates to the blockchain may comprise vehicle task assignments, statuses, and authorization information and one or more nodes in the system may be configured to incorporate one or more updates into blocks to add to the distributed database. In some embodiments, the nodes of the blockchain may be configured to enforce fleet rules, task transfer rules, and master reassignment rules through consensus.

Distributed database and shared ledger database generally refer to methods of peer-to-peer record keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (http://bitcoin.org/bitcoin.pdf), the entirety of which is incorporated herein by reference.

Figure 6:
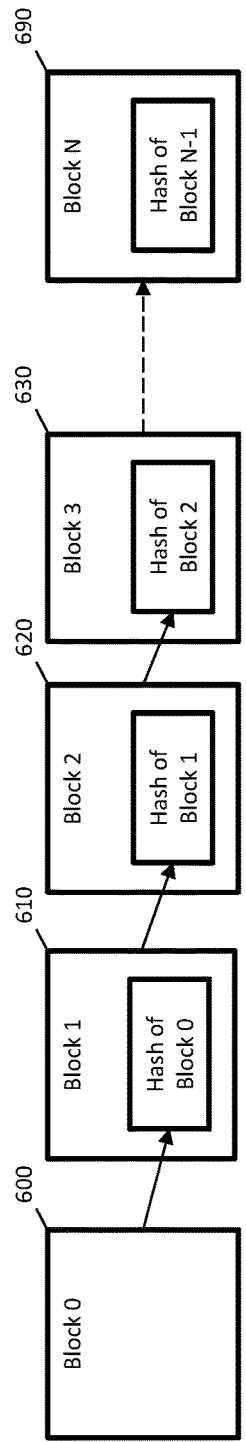
FIG. 6 comprises an illustration of blocks as configured in accordance with various embodiments of these teachings.

Now referring to FIG. 6, an illustration of a blockchain according to some embodiments is shown. In some embodiments, a blockchain comprises a hash chain or a hash tree in which each block added in the chain contains a hash of the previous block. In FIG. 6, block 0 600 represents a genesis block of the chain. Block 1 610 contains a hash of block 0 600, block 2 620 contains a hash of block 1 610, block 3 630 contains a hash of block 2 620, and so forth. Continuing down the chain, block N contains a hash of block N-1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners' are nodes that compete to provide proof-of-work to form a new block, and the first successful miner of a new block earns Bitcoin currency in return.

Figure 7:
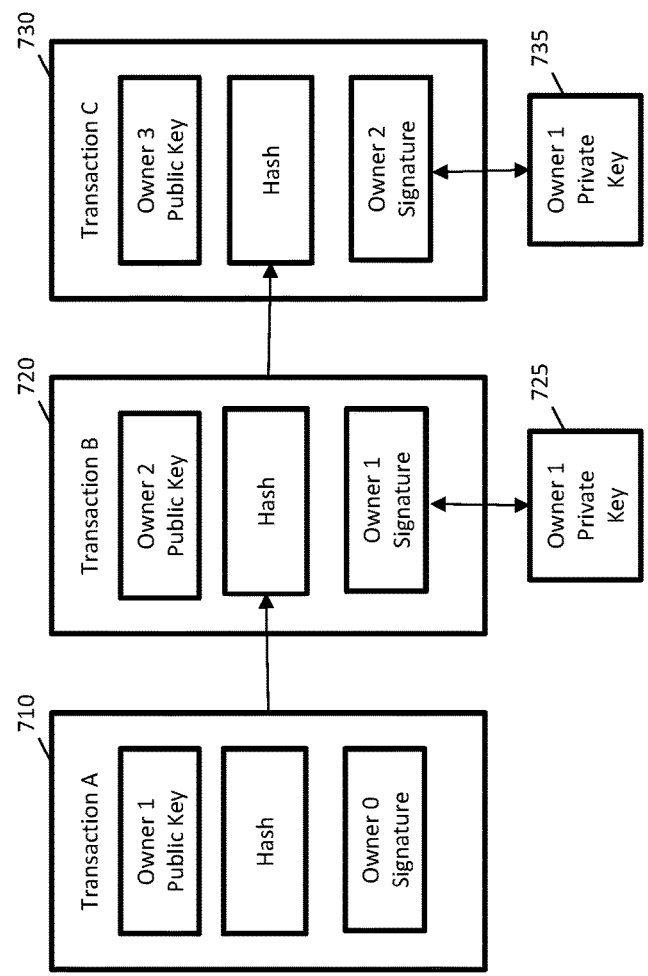
FIG. 7 comprises an illustration of transactions configured in accordance with various embodiments of these teachings.

Now referring to FIG. 7, an illustration of blockchain based transactions according to some embodiments is shown. In some embodiments, the blockchain illustrated in FIG. 7 comprises a hash chain protected by private/public key encryption. Transaction A 710 represents a transaction recorded in a block of a blockchain showing that owner 1 (recipient) obtained an asset from owner 0 (sender). Transaction A 710 contains owner's 1 public key and owner 0's signature for the transaction and a hash of a previous block. When owner 1 transfers the asset to owner 2, a block containing transaction B 720 is formed. The record of transaction B 720 comprises the public key of owner 2 (recipient), a hash of the previous block, and owner 1's signature for the transaction that is signed with the owner 1's private key 725 and verified using owner 1's public key in transaction A 710. When owner 2 transfers the asset to owner 3, a block containing transaction C 730 is formed. The record of transaction C 730 comprises the public key of owner 3 (recipient), a hash of the previous block, and owner 2's signature for the transaction that is signed by owner 2's private key 735 and verified using owner 2's public key from transaction B 220. In some embodiments, when each transaction record is created, the system may check previous transaction records and the current owner's private and public key signature to determine whether the transaction is valid. In some embodiments, transactions are broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 7 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 8:
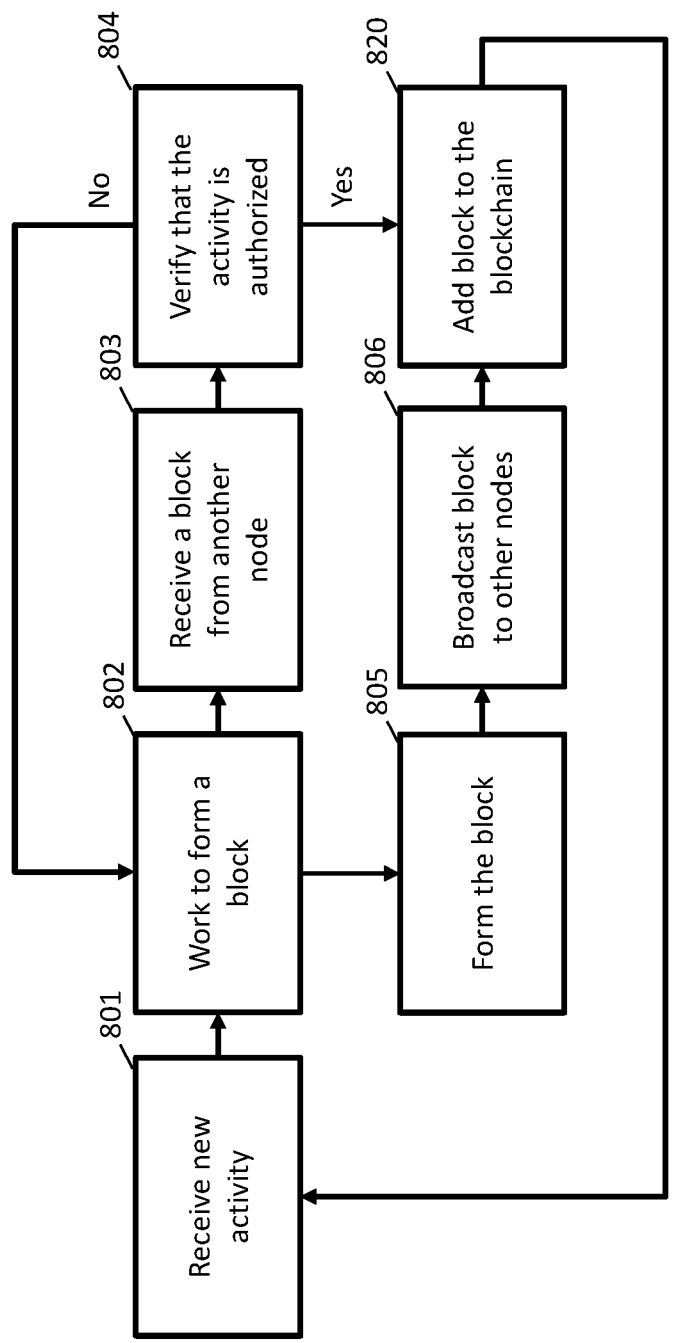
FIG. 8 comprises a flow diagram in accordance with various embodiments of these teachings.

Now referring to FIG. 8, a flow diagram according to some embodiments is shown. In some embodiments, the steps shown in FIG. 8 may be performed by a processor-based device, such as a computer system, a server, a distributed server, a timestamp server, a blockchain node, and the like. In some embodiments, the steps in FIG. 8 may be performed by one or more of the nodes in a system using blockchain for record keeping.

In step 801, a node receives a new activity. The new activity may comprise an update to the record being kept in the form of a blockchain. In some embodiments, for blockchain supported digital or physical asset record keeping, the new activity may comprise an asset transaction. In some embodiments, the new activity may be broadcasted to a plurality of nodes on the network prior to step 801. In step 802, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 802, if the node successfully forms a block in step 805 prior to receiving a block from another node, the node broadcasts the block to other nodes over the network in step 806. In some embodiments, in a system with incentive features, the first node to form a block may be permitted to add incentive payment to itself in the newly formed block. In step 820, the node then adds the block to its copy of the blockchain. In the event that the node receives a block formed by another node in step 803 prior to being able to form the block, the node works to verify that the activity recorded in the received block is authorized in step 804. In some embodiments, the node may further check the new block against system consensus rules for blocks and activities to verify whether the block is properly formed. If the new block is not authorized, the node may reject the block update and return to step 802 to continue to work to form the block. If the new block is verified by the node, the node may express its approval by adding the received block to its copy of the blockchain in step 820. After a block is added, the node then returns to step 801 to form the next block using the newly extended blockchain for the hash in the new block.

In some embodiments, in the event one or more blocks having the same block number is received after step 820, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 801.

Figure 9:
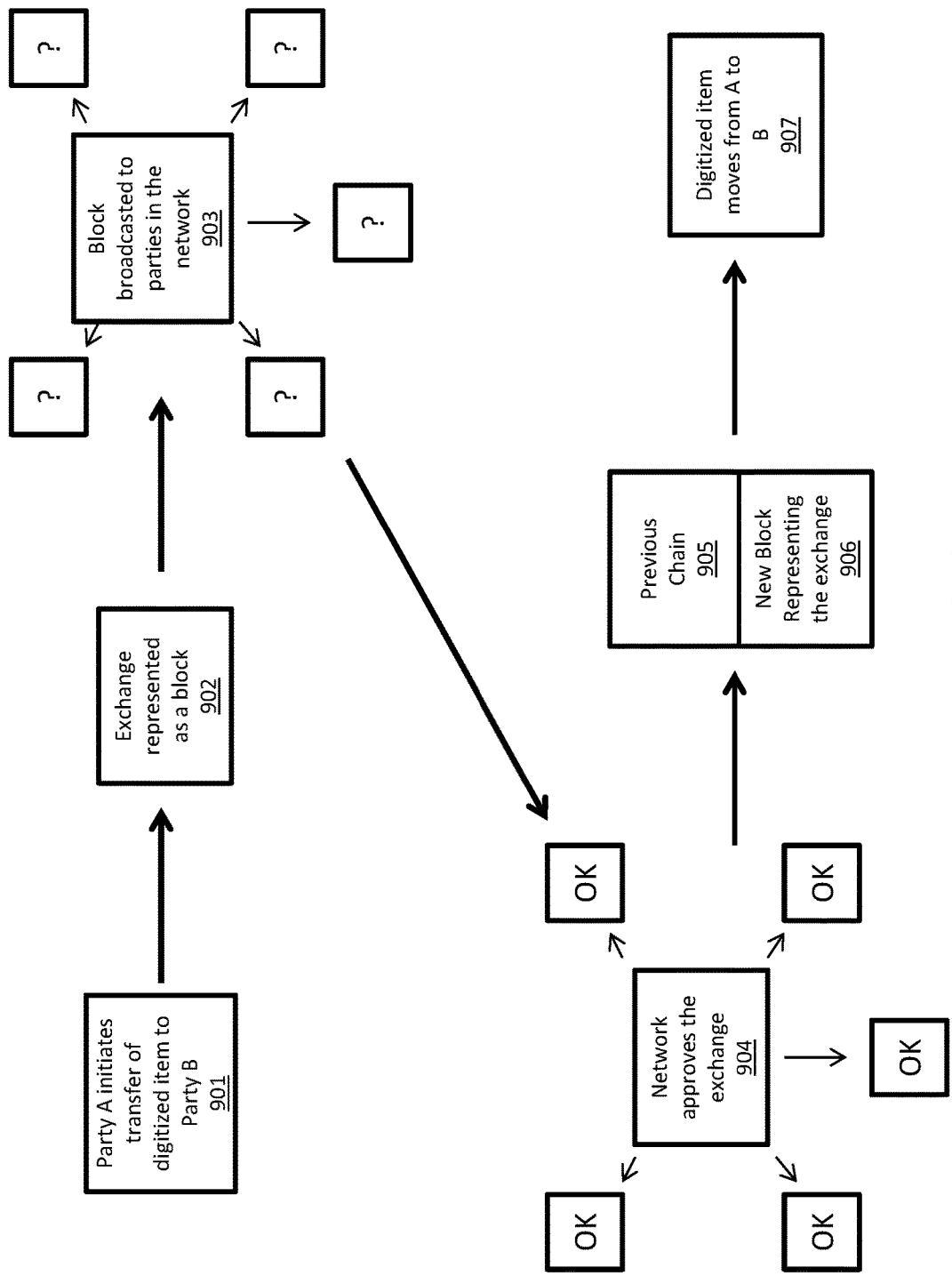
FIG. 9 comprises a process diagram as configured in accordance with various embodiments of these teachings.

Now referring to FIG. 9, a process diagram a blockchain update according to some implementations is shown. In step 901, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 902, the exchange initiated in step 901 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide proof of work to for block the may earn a Bitcoin. In some embodiments, a block may comprise one or more transactions between different parties that are broadcasted to the nodes. In step 903, the block is broadcasted to parties in the network. In step 904, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the asset he/she is seeks to transfer). In some embodiments, a block may be approved with consensus of the nodes in the network. After a block is approved, the new block 906 representing the exchange is added to the existing chain 905 comprising blocks that chronologically precede the new block 906. The new block 906 may contain the transaction(s) and a hash of one or more blocks in the existing chain 905. In some embodiments, each node may then update their copy of the blockchain with the new block and continue to work on extending the chain with additional transactions. In step 907, when the chain is updated with the new block, the digitized item is moved from party A to party B.

Figure 10:
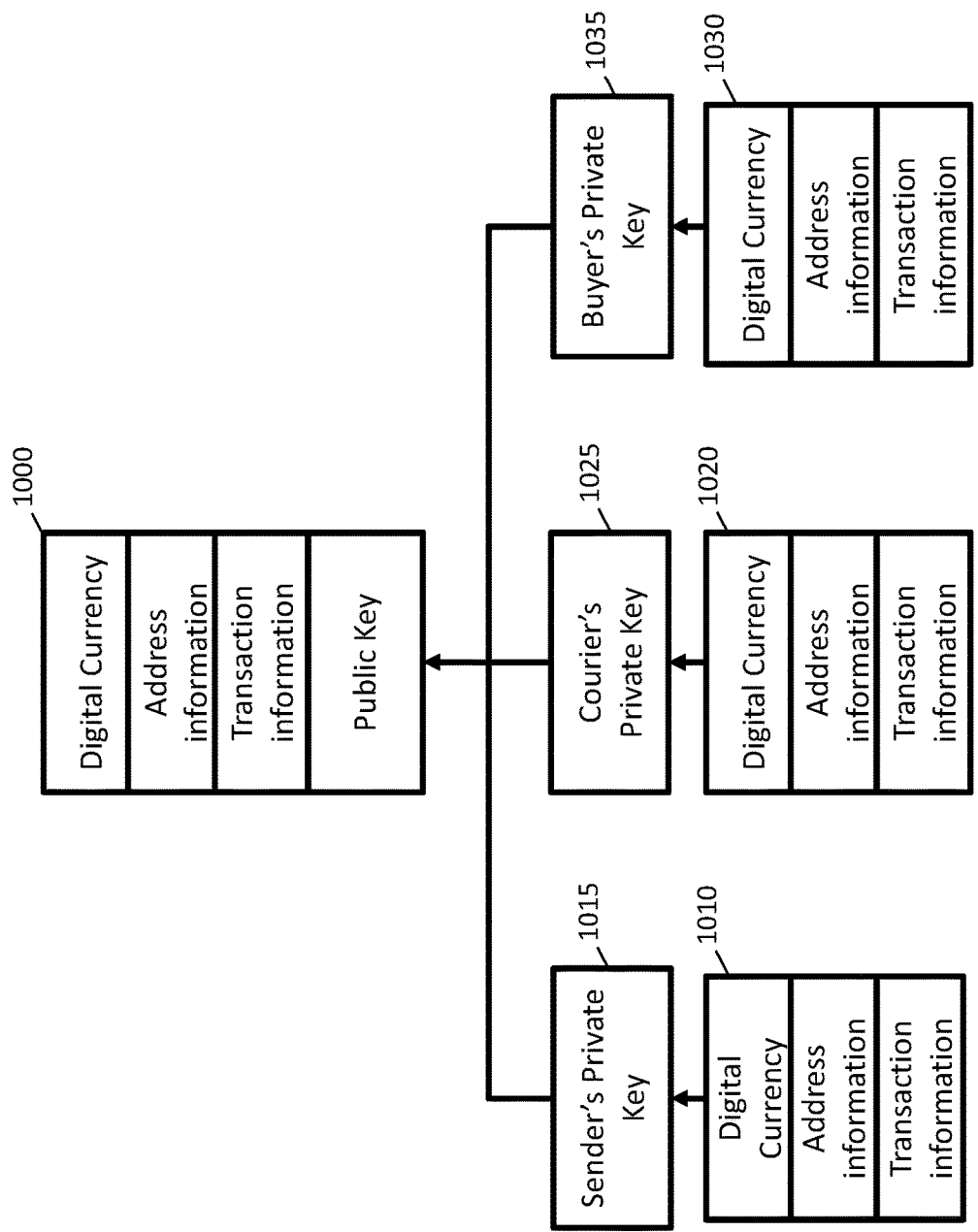
FIG. 10 comprises an illustration of a delivery record configured in accordance with various embodiments of these teachings.

Now referring to FIG. 10, a diagram of a blockchain according to some embodiments shown. FIG. 10 comprises an example of an implementation of a blockchain system for delivery service record keeping. The delivery record 1000 comprises digital currency information, address information, transaction information, and a public key associated with one or more of a sender, a courier, and a buyer. In some embodiments, nodes associated the sender, the courier, and the buyer may each store a copy of the delivery record 1010, 1020, and 1030 respectively. In some embodiments, the delivery record 1000 comprises a public key that allows the sender, the courier, and/or the buyer to view and/or update the delivery record 1000 using their private keys 1015, 1025, and 1035 respectively. For example, when a package is transferred from a sender to the courier, the sender may use the sender's private key 1015 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 1025 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 10, the delivery record may be updated by one or more of the sender, courier, and the buyer to form a record of the transaction without a trusted third party while preventing unauthorized modifications to the record. In some embodiments, the blockchain based transactions may further function to include transfers of digital currency with the completion of the transfer of physical asset. With the distributed database and peer-to-peer verification of a blockchain system, the sender, the courier, and the buyer can each have confidence in the authenticity and accuracy of the delivery record stored in the form of a blockchain.

Figure 11:
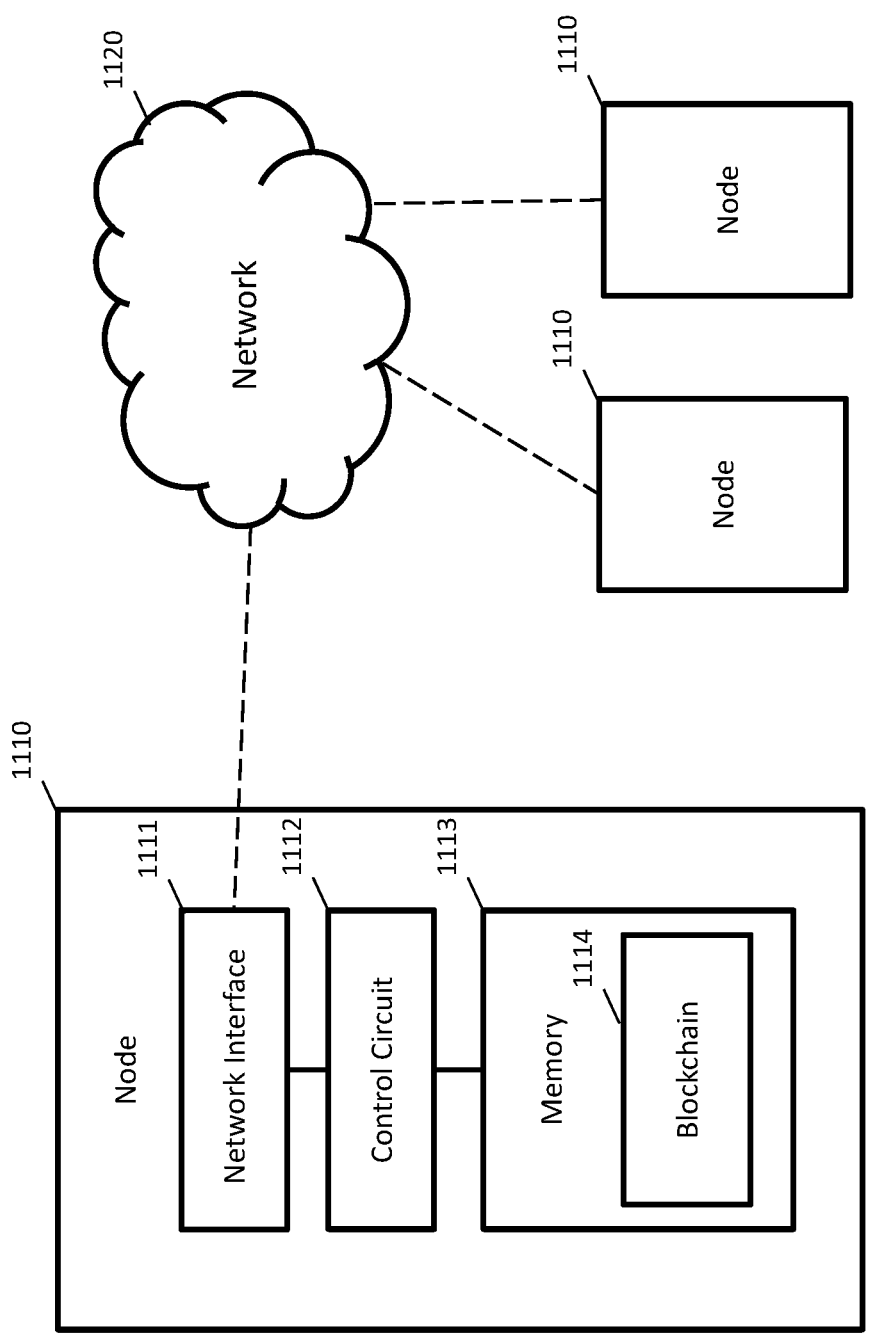
FIG. 11 comprise a system diagram configured in accordance with various embodiments of these teachings.

Now referring to FIG. 11, a system according to some embodiments is shown. A distributed blockchain system comprises a plurality of nodes 1110 communicating over a network 1120. In some embodiments, the nodes 1110 may comprise a distributed blockchain server and/or a distributed timestamp server. In some embodiments, one or more nodes 1110 may comprise or be similar to a "miner" device on the Bitcoin network. Each node 1110 in the system comprises a network interface 1111, a control circuit 1112, and a memory 1113.

The control circuit 1112 may comprise a processor, a microprocessor, and the like and may be configured to execute computer readable instructions stored on a computer readable storage memory 1113. The computer readable storage memory may comprise volatile and/or non-volatile memory and have stored upon it a set of computer readable instructions which, when executed by the control circuit 1112, causes the node 1110 update the blockchain 1114 stored in the memory 1113 based on communications with other nodes 1110 over the network 1120. In some embodiments, the control circuit 1112 may further be configured to extend the blockchain 1114 by processing updates to form new blocks for the blockchain 1114. Generally, each node may store a version of the blockchain 1114, and together, may form a distributed database. In some embodiments, each node 1110 may be configured to perform one or more steps described with reference to FIGS. 2-10 herein.

The network interface 1111 may comprise one or more network devices configured to allow the control circuit to receive and transmit information via the network 1120. In some embodiments, the network interface 1111 may comprise one or more of a network adapter, a modem, a router, a data port, a transceiver, and the like. The network 1120 may comprise a communication network configured to allow one or more nodes 1110 to exchange data. In some embodiments, the network 1120 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one or more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain based system allows content use, content exchange, and the use of content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that use one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

In one embodiment, a system for organizing autonomous product delivery vehicles comprises a locomotion system of a first autonomous vehicle, a communication device configured to communicate with other autonomous vehicles in an autonomous vehicle fleet comprising at least the first autonomous vehicle, a memory device, and a control circuit of the first autonomous vehicle coupled to the communication device and the memory device. The control circuit being configured to retrieve one or more vehicle tasks assigned to the first autonomous vehicle from a hash chain database associated with the autonomous vehicle fleet, wherein task parameters of the one or more vehicle tasks is at least partially encrypted with a public key of the autonomous vehicle, decrypt the task parameters with a private key of the first autonomous vehicle stored on the memory device, determine whether to perform the one or more vehicle tasks with the locomotion system of the first autonomous vehicle, detect a task transfer condition for the one or more vehicle tasks, identify, automatically by the first autonomous vehicle in response to the task transfer condition, a second autonomous vehicle as a transferee of the one or more vehicle tasks based on transfer rules in the task profile, and update, via the communication device, the hash chain database with a new block comprising a hash of preceding data in the hash chain database and the task parameters of the one or more vehicle tasks encrypted with a public key of the second autonomous vehicle.

In one embodiment, a method for organizing autonomous product delivery vehicles comprises retrieving, with a control circuit of a first autonomous vehicle, one or more vehicle tasks assigned to the first autonomous vehicle from a hash chain database associated with the autonomous vehicle fleet, wherein task parameters of the one or more vehicle tasks is at least partially encrypted with a public key of the autonomous vehicle, decrypting, with the control circuit, the task parameters with a private key of the first autonomous vehicle stored on a memory device of the first autonomous vehicle, determining whether to perform the one or more vehicle tasks with the locomotion system of the first autonomous vehicle, detecting, with the control circuit, a task transfer condition for the one or more vehicle tasks, identifying, automatically by the first autonomous vehicle in response to the task transfer condition, a second autonomous vehicle as a transferee of the one or more vehicle tasks based on transfer rules in the task profile, a second autonomous vehicle as a transferee of the one or more vehicle tasks, and update, via a communication device of the control circuit, the hash chain database with a new block comprising a hash of preceding data in the hash chain database and the task parameters of the one or more vehicle tasks encrypted with a public key of the second autonomous vehicle.

In one embodiment, a system for organizing autonomous product delivery vehicles comprises an autonomous vehicle fleet comprising a plurality of autonomous vehicles, wherein each of the plurality of autonomous vehicles comprises: a locomotion system, a communication device configured to communicate with other autonomous vehicles in the autonomous vehicle fleet, a memory device, and a control circuit coupled to the communication device and the memory device. The control circuit being configured to retrieve one or more vehicle tasks assigned to a first autonomous vehicle from a hash chain database associated with the autonomous vehicle fleet, wherein task parameters of the one or more vehicle tasks is at least partially encrypted with a public key of the autonomous vehicle, decrypt the task parameters with a private key of the first autonomous vehicle stored on the memory device, determine whether to perform the one or more vehicle tasks with the locomotion system of the first autonomous vehicle, detect a task transfer condition for the one or more vehicle tasks, identify , automatically by the first autonomous vehicle in response to the task transfer condition, a second autonomous vehicle as a transferee of the one or more vehicle tasks based on transfer rules in the task profile, and update, via the communication device, the hash chain database with a new block comprising a hash of preceding data in the hash chain database and the task parameters of the one or more vehicle tasks encrypted with a public key of the second autonomous vehicle.

In some embodiments, a system for autonomous product delivery vehicle fleet management comprises a locomotion system of a first autonomous vehicle, a communication device configured to communicate with other autonomous vehicles in an autonomous vehicle fleet comprising at least the first autonomous vehicle, and a control circuit of the first autonomous vehicle coupled to the communication device and the locomotion system. The control circuit being configured to receive, via the communication device, a request from a second autonomous vehicle to join the autonomous vehicle fleet, wherein the autonomous vehicle fleet comprises a master autonomous vehicle configured to coordinate tasks assigned to vehicles in the autonomous vehicle fleet, authenticate the second autonomous vehicle based on fleet rules stored in a hash chain database and update the hash chain database to add the second autonomous vehicle to the autonomous vehicle fleet, detect a master reassignment condition, and select an autonomous vehicle in the autonomous vehicle fleet as a new master autonomous vehicle based on master assignment rules stored in the hash chain database.

In some embodiments, a method for autonomous product delivery vehicle fleet management comprises receiving, at a control circuit and a communication device of a first autonomous vehicle, a request from a second autonomous vehicle to join an autonomous vehicle fleet comprising at least the first autonomous vehicle, wherein the autonomous vehicle fleet comprises a master autonomous vehicle configured to coordinate tasks assigned to vehicles in the autonomous vehicle fleet, authenticating the second autonomous vehicle based on fleet rules stored in a hash chain database and updating the hash chain database to add the second autonomous vehicle to the autonomous vehicle fleet, detecting, with the control circuit, a master reassignment condition, and selecting, with the control circuit, an autonomous vehicle in the autonomous vehicle fleet as the new master autonomous vehicle based on master assignment rules stored in the hash chain database.

In some embodiments, a method for autonomous product delivery vehicle fleet management comprises receiving, a first autonomous vehicle, a request from a second autonomous vehicle to join an autonomous vehicle fleet comprising at least the first autonomous vehicle, wherein the autonomous vehicle fleet comprises a master autonomous vehicle configured to coordinate tasks assigned to vehicles in the autonomous vehicle fleet, authenticating the second autonomous vehicle based on fleet rules stored in a hash chain database and updating the hash chain database to add the second autonomous vehicle to the autonomous vehicle fleet, assigning, by the first autonomous vehicle a task to the second autonomous vehicle by updating the hash chain database with a task assignment encrypted with a public key of the second autonomous vehicle, verifying, by the second autonomous vehicle, that the task assignment is assigned by a master autonomous vehicle of the autonomous vehicle fleet based on a fleet information in the hash chain prior to performing the task assignment, detecting, by one or more of the first autonomous vehicle and the second autonomous vehicle, a master reassignment condition, selecting, by one or more of the first autonomous vehicle and the second autonomous vehicle, an autonomous vehicle in the autonomous vehicle fleet as the new master autonomous vehicle based on master assignment rules stored in the hash chain database, and updating the hash chain with updated fleet information specifying the new master autonomous vehicle as the master autonomous vehicle of the autonomous vehicle fleet.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for organizing autonomous product delivery vehicles comprising:
    a locomotion system of a first autonomous vehicle;
    a communication device configured to communicate with other autonomous vehicles in an autonomous vehicle fleet comprising at least the first autonomous vehicle;
    a memory device; and
    a control circuit of the first autonomous vehicle coupled to the communication device and the memory device, the control circuit being configured to:
        retrieve one or more vehicle tasks assigned to the first autonomous vehicle from a hash chain database associated with the autonomous vehicle fleet, wherein task parameters of the one or more vehicle tasks are at least partially encrypted with a public key of the first autonomous vehicle;
        decrypt the task parameters with a private key of the first autonomous vehicle stored on the memory device;
        determine whether to perform the one or more vehicle tasks with the locomotion system of the first autonomous vehicle;
        detect a task transfer condition for the one or more vehicle tasks;
        identify, automatically by the first autonomous vehicle in response to the task transfer condition, a second autonomous vehicle as a transferee of the one or more vehicle tasks based on transfer rules in the task parameters; and
        update, via the communication device, the hash chain database with a new block comprising a hash of preceding data in the hash chain database and the task parameters of the one or more vehicle tasks encrypted with a public key of the second autonomous vehicle.

2. The system of claim 1, wherein the new block further comprises vehicle state parameters of the first autonomous vehicle, and wherein the second autonomous vehicle is configured to apply the vehicle state parameters of the first autonomous vehicle to the second autonomous vehicle to perform the one or more vehicle tasks.

3. The system of claim 1, wherein the new block further comprises task status information for the one or more vehicle tasks, the task status information being configured to allow the second autonomous vehicle to resume a partially completed task.

4. The system of claim 1, wherein the hash chain database is stored on a remote server and the first autonomous vehicle is configured to retrieve the hash chain database and/or the one or more vehicle tasks from the remote server via the communication device.

5. The system of claim 1, wherein the hash chain database is stored on a distributed database comprising onboard memory devices of a plurality of autonomous vehicles in the autonomous vehicle fleet.

6. The system of claim 5, wherein the update to the hash chain database comprises a database update broadcasted to one or more autonomous vehicles in the autonomous vehicle fleet via the communication device.

7. The system of claim 1, wherein the hash chain database comprises a blockchain in which each block corresponds to a vehicle task.

8. The system of claim 1, wherein one or more blocks in the hash chain database comprises autonomous vehicle capability and status information, and the second autonomous vehicle is identified as the transferee of the one or more vehicle tasks based on the autonomous vehicle capability and status information stored in the hash chain database.

9. The system of claim 1, wherein the control circuit is further configured to authenticate the second autonomous vehicle as a member of the autonomous vehicle fleet based on vehicle registry information stored in the hash chain database and prevent unauthorized access and/or modification of the hash chain database.

10. The system of claim 1, wherein the task transfer condition is determined based on one or more of: other assigned tasks, fuel level, vehicle condition, vehicle location, vehicle capability, weather condition, and task requirements.

11. A method for organizing autonomous product delivery vehicles comprising:
retrieving, with a control circuit of a first autonomous vehicle, one or more vehicle tasks assigned to the first autonomous vehicle from a hash chain database associated with an autonomous vehicle fleet, wherein task parameters of the one or more vehicle tasks is at least partially encrypted with a public key of the first autonomous vehicle;
decrypting, with the control circuit, the task parameters with a private key of the first autonomous vehicle stored on a memory device of the first autonomous vehicle;
determining whether to perform the one or more vehicle tasks with a locomotion system of the first autonomous vehicle;
detecting, with the control circuit, a task transfer condition for the one or more vehicle tasks;
identifying, automatically by the first autonomous vehicle in response to the task transfer condition, a second autonomous vehicle as a transferee of the one or more vehicle tasks based on transfer rules in the task parameters; and
update, via a communication device of the control circuit, the hash chain database with a new block comprising a hash of preceding data in the hash chain database and the task parameters of the one or more vehicle tasks encrypted with a public key of the second autonomous vehicle.

12. The method of claim 11, wherein the new block further comprises vehicle state parameters of the first autonomous vehicle, and wherein the second autonomous vehicle is configured to apply the vehicle state parameters of the first autonomous vehicle to the second autonomous vehicle to perform the one or more vehicle tasks.

13. The method of claim 11, wherein the new block further comprises task status information for the one or more vehicle tasks, the task status information being configured to allow the second autonomous vehicle to resume a partially completed task.

14. The method of claim 11, wherein the hash chain database is stored on a remote server and the first autonomous vehicle is configured to retrieve the hash chain database and/or the one or more vehicle tasks from the remote server via the communication device.

15. The method of claim 11, wherein the hash chain database is stored on a distributed database comprising onboard memory devices of a plurality of autonomous vehicles in the autonomous vehicle fleet.

16. The method of claim 15, wherein the update to the hash chain database comprises a database update broadcasted to one or more autonomous vehicles in the autonomous vehicle fleet via the communication device.

17. The method of claim 11, wherein the hash chain database comprises a blockchain in which each block corresponds to a vehicle task.

18. The method of claim 11, wherein one or more blocks in the hash chain database comprises autonomous vehicle capability and status information, and the second autonomous vehicle is identified as the transferee of the one or more vehicle tasks based on the autonomous vehicle capability and status information stored in the hash chain database.

19. The method of claim 11, wherein the task transfer condition is determined based on one or more of: other assigned tasks, fuel level, vehicle condition, vehicle location, vehicle capability, weather condition, and task requirements.

20. A system for organizing autonomous product delivery vehicles comprising:
an autonomous vehicle fleet comprising a plurality of autonomous vehicles, wherein each of the plurality of autonomous vehicles comprises:
a locomotion system;
a communication device configured to communicate with other autonomous vehicles in the autonomous vehicle fleet;
a memory device; and
a control circuit coupled to the communication device and the memory device, the control circuit being configured to:
retrieve one or more vehicle tasks assigned to a first autonomous vehicle from a hash chain database associated with the autonomous vehicle fleet, wherein task parameters of the one or more vehicle tasks are at least partially encrypted with a public key of the first autonomous vehicle;
decrypt the task parameters with a private key of the first autonomous vehicle stored on the memory device;
determine whether to perform the one or more vehicle tasks with the locomotion system of the first autonomous vehicle;
detect a task transfer condition for the one or more vehicle tasks;
identify, automatically by the first autonomous vehicle in response to the task transfer condition, a second autonomous vehicle as a transferee of the one or more vehicle tasks based on transfer rules in the task parameters; and
update, via the communication device, the hash chain database with a new block comprising a hash of preceding data in the hash chain database and the task parameters of the one or more vehicle tasks encrypted with a public key of the second autonomous vehicle.

* * * * *